(12) United States Patent
Kwon et al.

(10) Patent No.: US 12,103,408 B2
(45) Date of Patent: Oct. 1, 2024

(54) ENERGY-INDEPENDENT WATER ELECTROLYSIS FUEL CELL WATER VEHICLE SYSTEM

(71) Applicant: KWaterCraft Co., Ltd., Busan (KR)

(72) Inventors: Yong Jin Kwon, Busan (KR); Nam Ju Cho, Gyeongsangnam-do (KR)

(73) Assignee: KWATERCRAFT CO., LTD., Busan (KR)

(*) Notice: Subject to any disclaimer, the term of this patent is extended or adjusted under 35 U.S.C. 154(b) by 590 days.

(21) Appl. No.: 17/310,384

(22) PCT Filed: Jun. 5, 2019

(86) PCT No.: PCT/KR2019/006804
§ 371 (c)(1),
(2) Date: Jul. 29, 2021

(87) PCT Pub. No.: WO2020/159012
PCT Pub. Date: Aug. 6, 2020

(65) Prior Publication Data
US 2022/0090272 A1     Mar. 24, 2022

(30) Foreign Application Priority Data
Jan. 31, 2019   (KR) .................. 10-2019-0012644

(51) Int. Cl.
*C25B 1/04*   (2021.01)
*B60L 50/71*   (2019.01)
(Continued)

(52) U.S. Cl.
CPC .............. *B60L 50/71* (2019.02); *B60L 50/75* (2019.02); *B60L 58/30* (2019.02); *C25B 1/04* (2013.01);
(Continued)

(58) Field of Classification Search
None
See application file for complete search history.

(56) References Cited

U.S. PATENT DOCUMENTS 5,346,778 A * 9/1994 Ewan ................ H01M 8/04552
429/515
5,512,145 A * 4/1996 Hollenberg ........... H01M 8/065
204/266
(Continued)

FOREIGN PATENT DOCUMENTS

JP        11-113105 A      4/1999
JP     2001035503 A  *  2/2001
(Continued)

OTHER PUBLICATIONS

Www.espacenet.com machine translation of the detailed description of Jp 2001-035503A. (Year: 2001).*

*Primary Examiner* — Gregg Cantelmo
(74) *Attorney, Agent, or Firm* — Boisbrun Hofman, PLLC

(57) ABSTRACT

An energy-independent water electrolysis fuel cell water vehicle system is suggested. The energy-independent water electrolysis fuel cell water vehicle system suggested in the present invention comprises: a water electrolysis processing unit for performing a water electrolysis process by using supplied water while power is not being received from the outside; a gas control unit for adjusting the pressure of a hydrogen gas produced through the water electrolysis process, storing the hydrogen gas in a hydrogen storage by using a gas compression method, and then supplying the hydrogen gas; a fuel cell for generating electrical energy on the basis of the supplied hydrogen gas; and a power control unit for supplying the generated electrical energy as a driving power for the energy-independent water electrolysis fuel cell water vehicle system.

1 Claim, 4 Drawing Sheets

(51) Int. Cl.
  *B60L 50/75* (2019.01)
  *B60L 58/30* (2019.01)
  *C25B 15/02* (2021.01)
  *C25B 15/08* (2006.01)
  *H01M 8/04082* (2016.01)
  *H01M 8/0656* (2016.01)
  *H01M 16/00* (2006.01)

(52) U.S. Cl.
  CPC ............ *C25B 15/02* (2013.01); *C25B 15/085* (2021.01); *H01M 8/04201* (2013.01); *H01M 8/0656* (2013.01); *H01M 16/003* (2013.01); *H01M 16/006* (2013.01); *H01M 2250/20* (2013.01); *Y02E 60/36* (2013.01); *Y02T 90/40* (2013.01)

(56) References Cited

U.S. PATENT DOCUMENTS

| | | | | |
|---|---|---|---|---|
| 2002/0090868 | A1* | 7/2002 | Schmitman | H01M 8/186 440/113 |
| 2004/0131902 | A1* | 7/2004 | Frank | H01M 8/04089 429/432 |
| 2010/0206740 | A1* | 8/2010 | Takeuchi | C25B 1/04 204/276 |
| 2011/0198231 | A1* | 8/2011 | Eickhoff | H01M 8/0656 204/278 |
| 2017/0284287 | A1* | 10/2017 | Nathamani | H01M 8/0656 |

FOREIGN PATENT DOCUMENTS

| | | |
|---|---|---|
| JP | 2002098009 A | 4/2002 |
| KR | 10 2005 0075628 | 7/2005 |
| WO | 2020/159012 A1 | 8/2020 |

* cited by examiner

ENERGY-INDEPENDENT WATER ELECTROLYSIS FUEL CELL WATER VEHICLE SYSTEM

CROSS-REFERENCES TO RELATED APPLICATION

This application is based on and claims priority under 35 U.S.C. 119 to Korean Patent Application No. 10-2019-0012644, filed on 31 Jan. 2019 in the Korean intellectual property office, the disclosures of which are herein incorporated by reference in its entirety.

TECHNICAL FIELD

The present disclosure relates to an energy-independent water electrolysis fuel cell water vehicle system.

BACKGROUND OF THE INVENTION

Water electrolysis (electrolysis) systems are systems that electrochemically decompose water into oxygen and hydrogen. They are drawing attention as a hydrogen production technology because of benefits such as simple operating conditions, small volume, and high purity hydrogen, compared to other hydrogen production methods. Typical methods of water electrolysis in the field of water electrolysis include solid oxide electrolysis (SOE), polymer electrolyte membrane electrolysis (PEME), alkaline electrolysis (AE), etc.

In the field of water electrolysis, high-temperature steam electrolysis is a method that uses a phenomenon in which electrical energy required to decompose water decreases further at higher temperatures. This method allows for highly efficient water decomposition with a small amount of electrical energy and enables two-way operation because of the same structure and principle as solid oxide fuel cells (SOFC).

A fuel cell is a method of producing electricity through an electrochemical reaction between oxygen and hydrogen, which is considered as one of the alternative energy technologies because it creates less environmental pollution and is more energy-efficient than an internal combustion engine. Notably, water electrolysis systems, which produce oxygen by electrolyzing water, is gaining spotlight for its environmentally-friendly aspect of only emitting by-product oxygen, as well as for its near-100% hydrogen purity.

Polymer electrolyte membrane fuel cells (PEMFC), solid oxide fuel cells, phosphoric-acid fuel cells, fused carbonate fuel cells, and so on are continuously growing with a wide range of power supply and a variety of applications. Through the 2013 revision of a guideline on supporting renewable energy facilities, an energy yield and a correction coefficient of 6.5 were designated. Accordingly, the installation of renewable energy facilities in public institutions became mandatory, and these facilities are being rapidly introduced into the private marketplace.

Among the fields of fuel cell applications, fuel cells for transportation are focused on the vehicle market. Doosan Fuel Cell, which merged with ClearEdge Power, is focusing on the production of fuel cells used to power buildings and vehicles. Hyundai Motor Company has been manufacturing hydrogen-powered electric cars since January, 2018.

Korea Institute of Energy Research developed a flat tube-type high-temperature water electrolysis hydrogen production technology capable of reusing waste heat and steam of high temperature and high pressure. Ulsan National Institute of Science and Technology developed a solid oxide water electrolysis cell which produces 0.9 L of hydrogen for one hour by using two layers of perovskite as fuel electrode (anode) and air electrode (cathode).

Korean Laid-Open Patent Publication No. 10-2005-0075628 relates to a high-temperature methane reforming-type hybrid water electrolysis system, and discloses a technology for efficiently using energy and reducing energy consumption, compared to the existing water electrolysis systems, which is configured to produce hydrogen through both a steam reforming reaction of methane and a high-temperature water electrolysis reaction and to use heat generated by an autothermal reaction of methane and heat generated by a complete oxidation reaction or partial oxidation reaction of methane, for a water electrolyzer which requires a high-temperature operating condition.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A technical aspect of the present disclosure is to provide an energy-independent water electrolysis fuel cell water vehicle system which reduces the use of chemical fuels on a national scale, utilizes environmentally-friendly alternative energy, and enables energy production and use by producing hydrogen from water, which is easy to get and available everywhere, in an environmentally friendly way, aimed at reducing greenhouse gas reductions to deal with climate change and carrying out mandatory adaptation to climate change.

In one aspect, there is provided an energy-independent water electrolysis fuel cell water vehicle system according to the present disclosure, the system including: a water electrolysis processing unit for performing a water electrolysis process by using supplied water while power is not being received from the outside; a gas control unit for adjusting the pressure of a hydrogen gas produced through the water electrolysis process, storing the hydrogen gas in a hydrogen storage by using a gas compression method, and then supplying the hydrogen gas; a fuel cell for generating electrical energy on the basis of the supplied hydrogen gas; and a power control unit for supplying the generated electrical energy as a driving power for the energy-independent water electrolysis fuel cell water vehicle system.

The water electrolysis processing unit may include: a solar panel for supplying electric power required at an early stage of the water electrolysis process using solar energy and utilizing the same as standby power; a decomposition unit for generating clean hydrogen from filtered and purified water through hydrogen electrolysis using solar energy; and a hydrogen refining unit for converting the generated hydrogen into clean hydrogen with high purity through a hydrogen refining process.

The fuel cell may produce electricity through an electrochemical reaction between oxygen and the hydrogen gas produced through the water electrolysis process. The power control unit may store excess electricity in an energy storage device so as to enable driving without power supply.

In another aspect, there is provided a power supply method for an energy-independent water electrolysis fuel cell water vehicle system according to the present disclosure, the method including: performing a water electrolysis process by using supplied water while power is not being received from the outside; adjusting the pressure of a hydrogen gas produced through the water electrolysis process and supplying the hydrogen gas; generating electrical energy on the basis of the supplied hydrogen gas by using a polymer electrolyte fuel cell, a solid oxide fuel cell, a phosphoric-acid fuel cell, or a fused carbonate fuel cell; and supplying the generated electrical energy as a driving power for the energy-independent water electrolysis fuel cell water vehicle system.

In the performing of a water electrolysis process by using supplied water while power is not being received from the outside, power required at an early stage of the water electrolysis process may be supplied using solar energy and utilized as standby power, clean hydrogen may be generated from filtered and purified water through hydrogen electrolysis using solar energy, and the generated hydrogen may be converted into clean hydrogen with high purity through a hydrogen refining process.

In the generating of electrical energy on the basis of the supplied hydrogen gas by using a polymer electrolyte fuel cell, electricity may be produced by a fuel cell through an electrochemical reaction between oxygen and the hydrogen gas produced through the water electrolysis process, and excess electricity may be stored in an energy storage device so as to enable driving without power supply from the outside.

According to embodiments of the present disclosure, it is possible to provide an energy-independent water electrolysis fuel cell water vehicle system which reduces the use of chemical fuels, utilizes environmentally-friendly alternative energy, and enables energy production and use by producing hydrogen from water, which is easy to get and available everywhere, in an environmentally friendly way.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the invention.

There are measures being expanded to reduce the use of chemical fuels on a national scale, utilize environmentally-friendly alternative energy, and enable energy production and use by producing hydrogen from water, which is easy to get and available everywhere, in an environmentally friendly way, aimed at reducing greenhouse gas reductions to deal with climate change and carrying out mandatory adaptation to climate change. Notably, hydrogen energy is considered as an alternative to fossil fuels because it produces electrical energy using a fuel cell. However, it requires building an infrastructure for supply and storage, as well as the installation of hydrogen filling stations for hydrogen supply. Hereinafter, an embodiment of the present disclosure will be described in detail with reference to the accompanying drawings.

Figure 1:
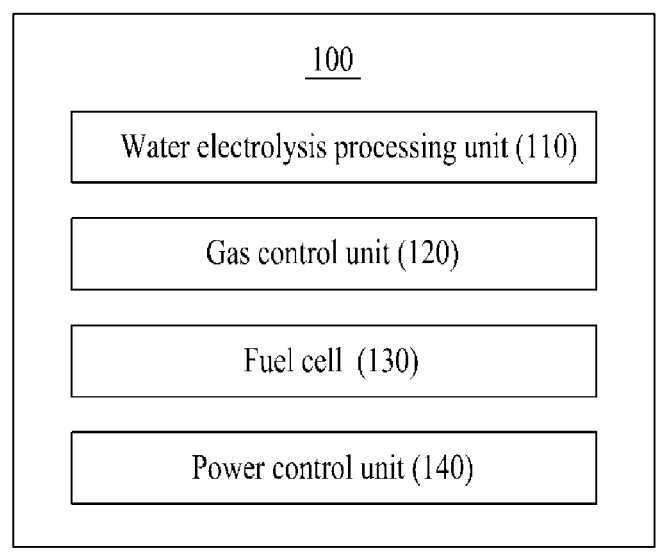
FIG. 1 is a view showing a configuration of an energy-independent water electrolysis fuel cell water vehicle system according to an embodiment of the present disclosure.

FIG. 1 is a view showing a configuration of an energy-independent water electrolysis fuel cell water vehicle system according to an embodiment of the present disclosure.

The suggested energy-independent water electrolysis fuel cell water vehicle system 100 includes a water electrolysis processing unit 110, a gas control unit 120, a fuel cell 130, and a power control unit 140.

The water electrolysis processing unit 110 performs a water electrolysis process by using supplied water while power is not being received from the outside. The water electrolysis processing unit 110 may include a solar panel, a decomposition unit, and a hydrogen refining unit. The solar panel may supply electric power required at an early stage of the water electrolysis process using solar energy and utilize this power as standby power. The decomposition unit may generate clean hydrogen from filtered and purified water through hydrogen electrolysis using solar energy. The hydrogen refining unit may convert the generated hydrogen into clean hydrogen with high purity through a hydrogen refining process.

The gas control unit 120 may adjust the pressure of a hydrogen gas produced through the water electrolysis process, store the hydrogen gas in a hydrogen storage by using a gas compression method, and then supply the hydrogen gas.

The fuel cell 130 may produce electrical energy on the basis of the supplied hydrogen gas. The fuel cell 130 produces electricity through an electrochemical reaction between oxygen and the hydrogen gas produced through the water electrolysis process.

The power control unit 140 supplies the generated electrical energy as a driving power for the energy-independent water electrolysis fuel cell water vehicle system. The power control unit 140 stores excess electricity in an energy storage device so as to enable driving without power supply. The configuration of the suggested energy-independent water electrolysis fuel cell water vehicle system will be described in more details with reference to FIG. 2.

Figure 2:
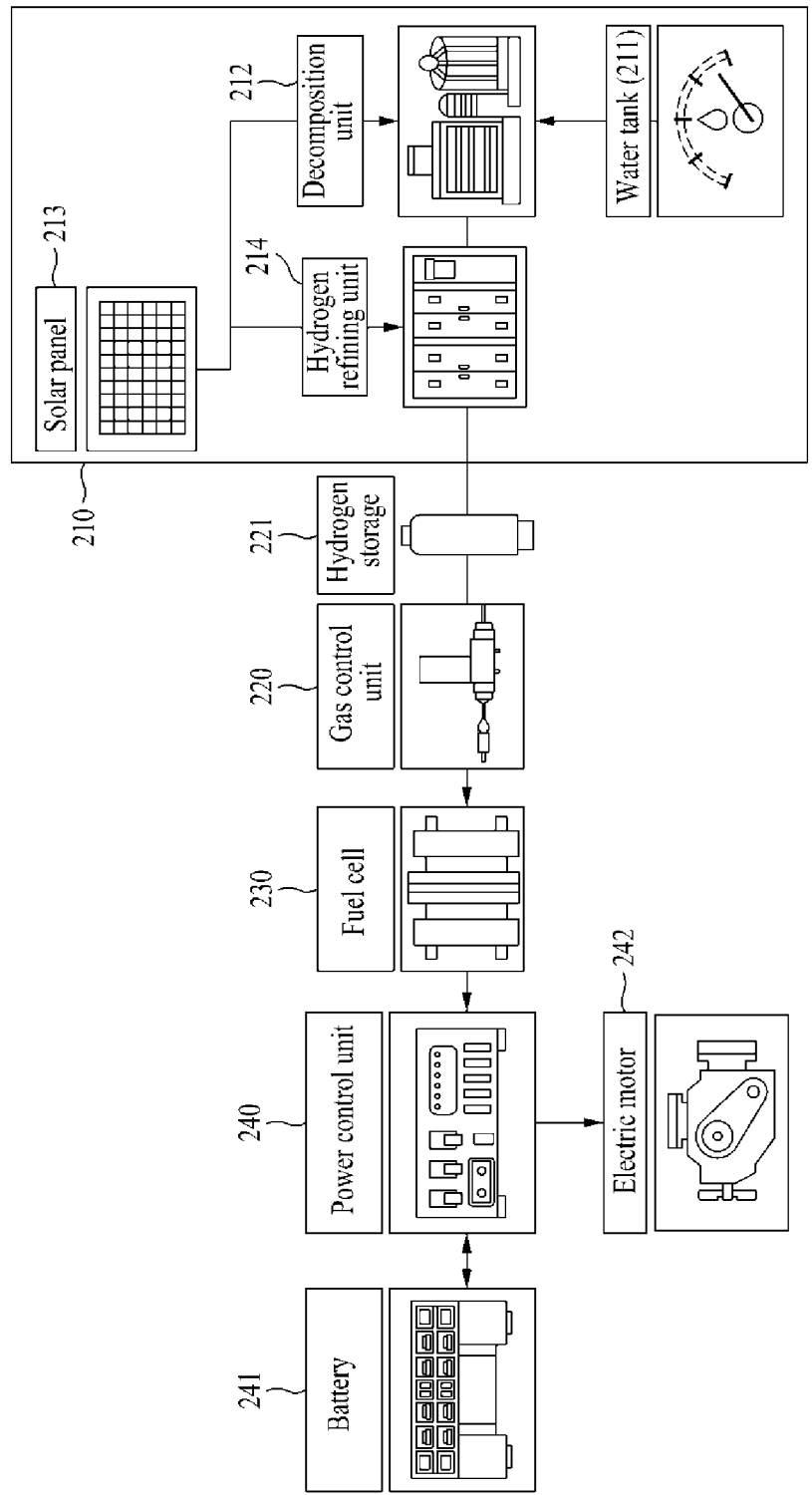
FIG. 2 is a detailed view for explaining an operation of an energy-independent water electrolysis fuel cell water vehicle system according to an embodiment of the present disclosure.

FIG. 2 is a detailed view for explaining an operation of an energy-independent water electrolysis fuel cell water vehicle system according to an embodiment of the present disclosure.

The water electrolysis processing unit 210 may include a water tank 211, a decomposition unit 212, a hydrogen refining unit 214, and a solar panel 213. A water electrolysis process may be performed using water supplied from the water tank 211, without being supplied with power from the outside, by using solar energy supplied through the solar panel 213. The solar panel may supply electric power required at an early stage of the water electrolysis process using solar energy and utilize this power as standby power.

The supplied water is purified into clean water through a filter or the like and supplied to the decomposition unit 212 for performing a water electrolysis process. The decomposition unit 212 may generate clean hydrogen from filtered and purified water through hydrogen electrolysis using solar energy.

The hydrogen refining unit 214 may convert the generated hydrogen into clean hydrogen with high purity through a hydrogen refining process. It is possible to provide an energy-independent water electrolysis fuel cell water vehicle system capable of allowing for energy production and use by producing hydrogen from water in an environmentally friendly way. A hydrogen gas produced through water electrolysis is stored in a hydrogen storage 221, and a gas control unit 220 adjusts the pressure and supplies the hydrogen gas. According to the embodiment of the present disclosure, a fuel cell 230 may produce electric power by using a polymer electrolyte fuel cell, a solid oxide fuel cell, a phosphoric-acid fuel cell, or a fused carbonate fuel cell. It is possible to produce electricity through a fuel cell that produces electricity through an electrochemical reaction between hydrogen and oxygen using the produced hydrogen.

The produced electricity is transferred to an electric motor 242 to drive the suggested energy-independent water electrolysis fuel cell water vehicle system under control of a power control unit 240, or an excess of the produced electricity may be stored in an energy storage device, for example, a battery 241, to drive the suggested energy-independent water electrolysis fuel cell water vehicle system without external power supply.

Figure 3:
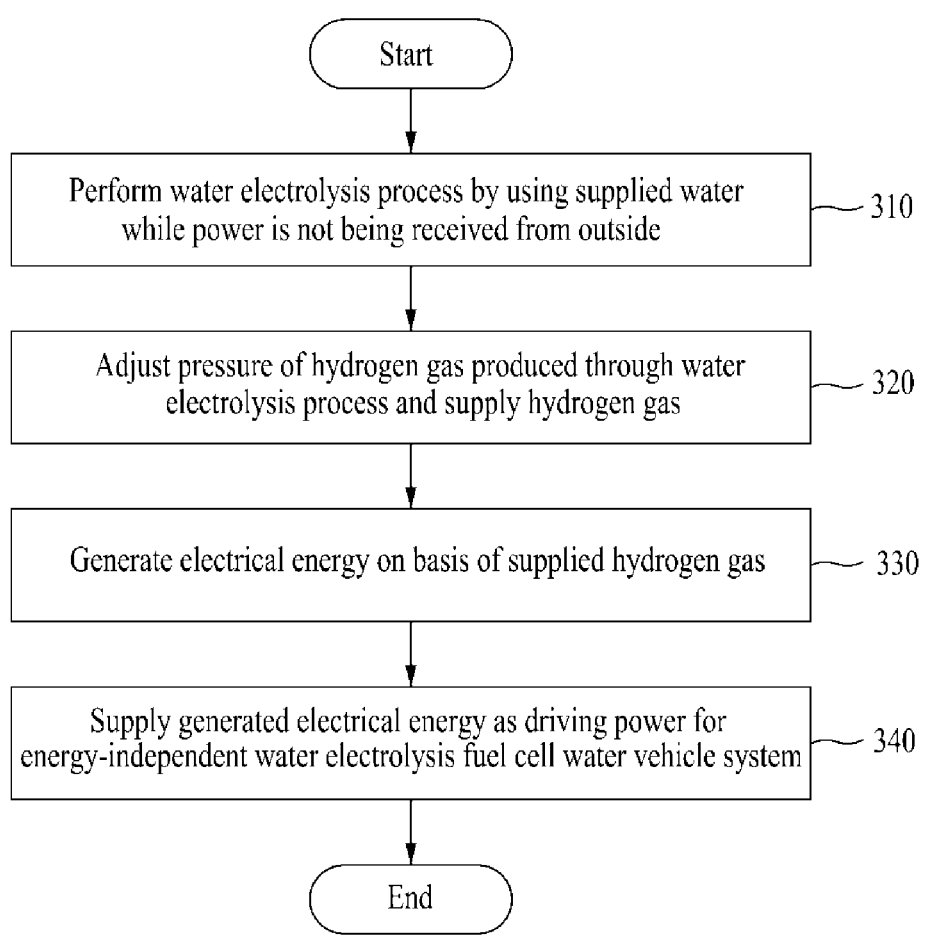
FIG. 3 is a flowchart for explaining a power supply method for an energy-independent water electrolysis fuel cell water vehicle system according to an embodiment of the present disclosure.

FIG. 3 is a flowchart for explaining a power supply method for an energy-independent water electrolysis fuel cell water vehicle system according to an embodiment of the present disclosure.

A power supply method for the suggested energy-independent water electrolysis fuel cell water vehicle system may include: the step 310 of performing a water electrolysis process by using supplied water while power is not being received from the outside; the step 320 of adjusting the pressure of a hydrogen gas produced through the water electrolysis process and supplying the hydrogen gas; the step 330 of generating electrical energy on the basis of the supplied hydrogen gas; and the step 340 of supplying the generated electrical energy as a driving power for the energy-independent water electrolysis fuel cell water vehicle system.

In the step 310, a water electrolysis process may be performed by using supplied water while power is not being received from the outside. Using solar energy through a solar panel, electric power required at an early stage of the water electrolysis process may be supplied and utilized as standby power. Also, by means of a decomposition unit, clean hydrogen may be generated from filtered and purified water through hydrogen electrolysis using solar energy. A hydrogen refining unit may convert the generated hydrogen into clean hydrogen with high purity through a hydrogen refining process.

In the step 320, the pressure of a hydrogen gas produced through the water electrolysis process may be adjusted, the pressure of the produced hydrogen gas may be adjusted, and the hydrogen may be stored in a hydrogen storage by gas compression and then supplied.

In the step 330, electrical energy may be generated on the basis of the supplied hydrogen gas by using a polymer electrolyte fuel cell, a solid oxide fuel cell, a phosphoric-acid fuel cell, or a fused carbonate fuel cell. Electricity is produced through an electrochemical reaction between oxygen and the hydrogen gas produced through the water electrolysis process.

In the step 340, the generated electrical energy may be supplied as a driving power for the energy-independent water electrolysis fuel cell water vehicle system. By means of a power control unit, excess electricity may be stored in an energy storage device so as to enable driving without power supply. The configuration of the suggested energy-independent water electrolysis fuel cell water vehicle system will be described in more details with reference to FIG. 2.

Figure 4:
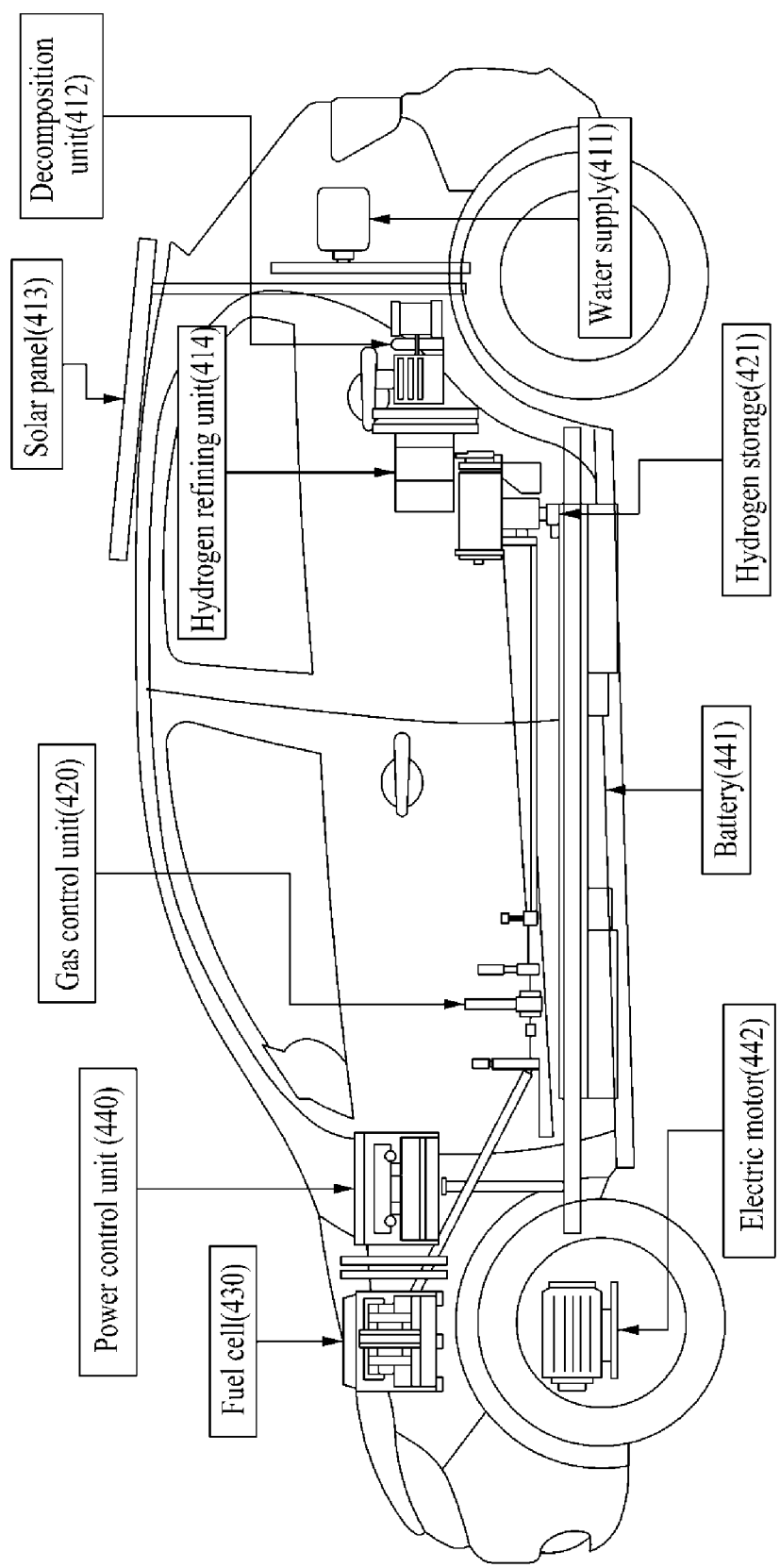
FIG. 4 is a perspective view of an energy-independent water vehicle according to an embodiment of the present disclosure.

FIG. 4 is a perspective view of an energy-independent water vehicle according to an embodiment of the present disclosure.

As explained above, a water electrolysis process may be performed using water supplied 411 from the water tank, without being supplied with power from the outside, by using solar energy supplied through the solar panel 413. The solar panel may supply electric power required at an early stage of the water electrolysis process using solar energy and utilize this power as standby power.

The supplied water is purified into clean water through a filter or the like and supplied to the decomposition unit 412 for performing a water electrolysis process. The decomposition unit 412 may generate clean hydrogen from filtered and purified water through hydrogen electrolysis using solar energy.

The hydrogen refining unit 414 may convert the generated hydrogen into clean hydrogen with high purity through a hydrogen refining process. It is possible to provide an energy-independent water electrolysis fuel cell water vehicle system capable of allowing for energy production and use by producing hydrogen from water in an environmentally friendly way. A hydrogen gas produced through water electrolysis is stored in a hydrogen storage 421, and a gas control unit 420 adjusts the pressure and supplies the hydrogen gas. According to the embodiment of the present disclosure, a fuel cell 430 may produce electric power by using a polymer electrolyte fuel cell, a solid oxide fuel cell, a phosphoric-acid fuel cell, or a fused carbonate fuel cell. It is possible to produce electricity through a fuel cell that produces electricity through an electrochemical reaction between hydrogen and the produced hydrogen.

The produced electricity is transferred to an electric motor 442 to drive the suggested energy-independent water electrolysis fuel cell water vehicle system under control of a power control unit 440, or an excess of the produced electricity may be stored in an energy storage device, for example, a battery 441, to drive the suggested energy-independent water electrolysis fuel cell water vehicle system without external power supply.

As above, according to embodiments of the present disclosure, it is possible to provide an energy-independent water electrolysis fuel cell water vehicle system which reduces the use of chemical fuels, utilizes environmentally-friendly alternative energy, and enables energy production and use by producing hydrogen from water, which is easy to get and available everywhere, in an environmentally friendly way.

The system described herein may be implemented using hardware components, software components, and/or a combination thereof. For example, the system and the components described herein may be implemented using one or more general-purpose or special purpose computers or processing devices, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include computer programs, code, instructions or one or more combinations thereof, and may configure a processing device to operate in a desired manner or may independently or collectively control the processing device. The software and/or data may be embodied in any type of machine, components, physical equipment, virtual equipment, or computer storage media or units so as to be interpreted by the processing device or to provide instructions or data to the processing device. The software may be dispersed throughout a networked computer system and stored or executed in a dispersion manner. The software and data may be recorded in one or more computer-readable storage media.

The method according to the above-described embodiments may be implemented with program instructions which may be executed through various computer means, and may be recorded in computer-readable media. The computer-readable media may also include, alone or in combination, the program instructions, data files, data structures, and the like. The program instructions recorded on the media may be those specially designed and constructed for the purposes of example embodiments, or they may be of the kind well-known and available to those having skill in the computer software arts. Examples of the computer-readable recording media may include magnetic media such as hard disks, floppy disks, and magnetic tapes, optical media such as CD-ROMs and DVDs, magneto-optical media such as floptical disks, and hardware devices specially configured to store and perform program instructions, such as ROM (ROM), random access memory (RAM), and flash memory. Examples of the program instructions may include machine-language code, such as code written by a compiler, and high-level language code executable by a computer using an interpreter.

As described above, although the embodiments have been described in connection with the limited embodiments and the drawings, those skilled in the art may modify and change the embodiments in various ways from the description. For example, proper results may be achieved although the aforementioned descriptions are performed in a different order from that of the described method and/or the aforementioned elements, such as the system, configuration, device, and circuit, are coupled or combined in a form different from that of the described method, or replaced or substituted with other elements or equivalents.

Accordingly, other implementations, other embodiments, and equivalents of the claims fall within the scope of the claims.

The embodiments of the invention in which an exclusive property or privilege is claimed are defined as follows:

1. An energy-independent water electrolysis fuel cell vehicle system, the system comprising:
   a water electrolysis processing unit for performing a water electrolysis process by using supplied water while power is not being received from outside;
   a gas control unit for adjusting pressure of a hydrogen gas produced through the water electrolysis process, the hydrogen gas being stored in a hydrogen storage by using a gas compression method, and then the hydrogen gas being supplied to a fuel cell;
   the hydrogen storage;
   the fuel cell for generating electrical energy based on the supplied hydrogen gas; and
   a power control unit for supplying the generated electrical energy as a driving power for the energy-independent water electrolysis fuel cell vehicle system;
   wherein the water electrolysis processing unit comprises:
      a solar panel for supplying electric power required at an early stage of the water electrolysis process using solar energy and utilizing at least a portion of the solar energy as standby power;
      a decomposition unit for generating clean hydrogen from filtered and purified water through hydrogen electrolysis using solar energy; and
      a hydrogen refining unit for converting the generated hydrogen into clean hydrogen with high purity;
   wherein the fuel cell produces electricity through an electrochemical reaction between oxygen and the hydrogen gas produced through the water electrolysis process;
   wherein, while power is not being received from the outside, the power control unit is controlled to store excess electricity in an energy storage device to perform the water electrolysis process using the supplied water in the absence of external power supply, and the excess electricity corresponds to electricity left after supplying power for the energy-independent water electrolysis fuel cell vehicle system;
   wherein the water electrolysis processing unit further includes a water tank, the water electrolysis process is performed using supplied water from the water tank without external power supply by solar energy supplied through the solar panel, the supplied water is purified into clean water through a filter and supplied to the decomposition unit for performing the water electrolysis process, the hydrogen gas produced through the water electrolysis process is stored in the hydrogen storage, and a pressure and supply of the hydrogen gas is adjusted by the gas control unit;
   wherein the fuel cell generates electrical energy on the basis of the supplied hydrogen gas by using a polymer electrolyte fuel cell, a solid oxide fuel cell, a phosphoric-acid fuel cell, or a fused carbonate fuel cell, and generates the electricity energy through an electrochemical reaction between oxygen and the hydrogen gas produced through the water electrolysis process;
   wherein the electricity energy is transferred to electric motors to drive the energy-independent water electrolysis fuel cell vehicle system and excess electric energy among the electric energy is stored in the energy storage device, based on the control of the power control unit; and
   wherein the energy-independent water electrolysis fuel cell vehicle system comprises a front section where front wheels are arranged, a rear section where rear wheels are arranged, and a middle section where seats are arranged between the front section and the rear section, wherein:
      the fuel cell and the power control unit are disposed at the front section;

the gas control unit and a battery of the energy-independent water electrolysis fuel cell vehicle system are disposed at the middle section;
the decomposition unit and the hydrogen refining unit of the water electrolysis processing unit are disposed at the rear section;
the water for the water electrolysis process is supplied at the rear section; and
the solar panel of the water electrolysis is disposed on a roof of the energy-independent water electrolysis fuel cell vehicle system at the rear section.

\* \* \* \* \*